United States Patent
Fainstein et al.

(10) Patent No.: US 8,590,010 B2
(45) Date of Patent: Nov. 19, 2013

(54) RETENTION BASED INTRINSIC FINGERPRINT IDENTIFICATION FEATURING A FUZZY ALGORITHM AND A DYNAMIC KEY

(75) Inventors: Daniel J. Fainstein, Beacon, NY (US); Alberto Cestero, Poughkeepsie, NY (US); Subramanian S. Iyer, Mount Kisco, NY (US); Toshiaki Kirihata, Poughkeepsie, NY (US); Norman W. Robson, Hopewell Junction, NY (US); Sami Rosenblatt, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/302,314

(22) Filed: Nov. 22, 2011

(65) Prior Publication Data

US 2013/0133031 A1    May 23, 2013

(51) Int. Cl.
*H03M 13/05*      (2006.01)
(52) U.S. Cl.
USPC .......... 726/2; 324/649; 324/750.15; 714/763; 714/768; 713/189; 365/154; 726/26; 726/9; 380/44; 380/46
(58) Field of Classification Search
USPC ............. 713/193, 168, 189; 726/9, 2; 380/46; 702/57
See application file for complete search history.

(56) References Cited

U.S. PATENT DOCUMENTS

| | | | | |
|---|---|---|---|---|
| 5,051,374 A | * | 9/1991 | Kagawa et al. | 438/449 |
| 5,617,531 A | * | 4/1997 | Crouch et al. | 714/30 |
| 6,161,213 A | * | 12/2000 | Lofstrom | 324/750.15 |
| 6,367,042 B1 | * | 4/2002 | Phan et al. | 714/733 |
| 6,403,251 B1 | * | 6/2002 | Baggaley et al. | 429/61 |
| RE40,188 E | * | 3/2008 | Lofstrom | 324/750.15 |
| 7,757,083 B2 | * | 7/2010 | Devadas et al. | 713/168 |

(Continued)

FOREIGN PATENT DOCUMENTS

WO    2011089143    7/2011

OTHER PUBLICATIONS

Y. Su et al., A 1.6pJ/bit 96% Stable Chip-ID Generating Circuit using Process Variations, IEEE International Solid-State Circuits Conference (2007).*

(Continued)

*Primary Examiner* — Morshed Mehedi
*Assistant Examiner* — Sharon Lynch
(74) *Attorney, Agent, or Firm* — H. Daniel Schnurmann

(57) ABSTRACT

A random intrinsic chip ID generation employs a retention fail signature. A $1^{st}$ and $2^{nd}$ ID are generated using testing settings with a $1^{st}$ setting more restrictive than the $2^{nd}$, creating more fails in the $1^{st}$ ID bit string that includes $2^{nd}$ ID bit string. A retention pause time controls the number of retention fails, adjusted by a BIST engine, wherein the fail numbers satisfy a predetermined fail target. Verification confirms whether the $1^{st}$ ID includes the $2^{nd}$ ID bit string, the ID being the one used for authentication. Authentication is enabled by a $3^{rd}$ ID with intermediate condition such that $1^{st}$ ID includes $3^{rd}$ ID bit string and $3^{rd}$ ID includes $2^{nd}$ ID bit string. The intermediate condition includes a guard-band to eliminate bit instability problem near the 1st and $2^{nd}$ ID boundary. The intermediate condition is changed at each ID read operation, resulting in a more secure identification.

13 Claims, 10 Drawing Sheets

(56) References Cited

U.S. PATENT DOCUMENTS

| | | | |
|---|---|---|---|
| 7,840,803 B2 | 11/2010 | Clarke et al. | |
| 7,945,791 B2* | 5/2011 | Orlando et al. | 713/193 |
| 8,219,857 B2* | 7/2012 | Gebara et al. | 714/42 |
| 2002/0024905 A1 | 2/2002 | Kahlman et al. | |
| 2003/0204743 A1* | 10/2003 | Devadas et al. | 713/200 |
| 2006/0221686 A1* | 10/2006 | Devadas et al. | 365/185.03 |
| 2006/0271792 A1* | 11/2006 | Devadas et al. | 713/189 |
| 2006/0271793 A1* | 11/2006 | Devadas et al. | 713/189 |
| 2007/0018677 A1* | 1/2007 | Marr | 324/765 |
| 2007/0183194 A1* | 8/2007 | Devadas et al. | 365/185.03 |
| 2009/0011596 A1* | 1/2009 | Okuno | 438/682 |
| 2009/0138772 A1* | 5/2009 | Bertacco et al. | 714/733 |
| 2009/0326840 A1* | 12/2009 | Gebara et al. | 702/57 |
| 2010/0097843 A1* | 4/2010 | Bardouillet et al. | 365/148 |
| 2010/0176920 A1 | 7/2010 | Kursawe et al. | |
| 2010/0306832 A1 | 12/2010 | Mu et al. | |
| 2011/0215829 A1 | 9/2011 | Merchan et al. | |
| 2011/0234241 A1* | 9/2011 | Lewis et al. | 324/649 |
| 2012/0033810 A1* | 2/2012 | Devadas et al. | 380/46 |
| 2012/0159276 A1* | 6/2012 | Zandian et al. | 714/734 |
| 2012/0179952 A1* | 7/2012 | Tuyls et al. | 714/768 |
| 2012/0183135 A1* | 7/2012 | Paral et al. | 380/44 |
| 2012/0230087 A1* | 9/2012 | Chellappa et al. | 365/154 |
| 2012/0243310 A1* | 9/2012 | Huang et al. | 365/185.03 |
| 2012/0246494 A1* | 9/2012 | Gebara et al. | 713/300 |

OTHER PUBLICATIONS

Taniya Siddiqua, A Multi-Level Approach to Reduce the Impact of NBTI on Processor Functional Units, Greater Lakes Symposium on VLSI (May 16-18, 2010).*

Maximilian Hofer & Christoph Boehm, An Alternative to Error Correction for SRAM-Like PUFS, Proceedings of the 12th International Conference on Cryptographic Hardware and Embedded Systems (CHES) 335-350 (2010).*

Science and Technology Information Center Search Strategy Report including terms searched, list of patents and non-patent literature (Jun. 19, 2013).*

"A Digita 1.6 pJ/bit Chip Identification Circuit Using Process Variations", Y. Su, et al., IEEE Journal of Solid-State Circuits, vol. 43, No. 1, Jan. 2008.

"A Chip-ID Generating Circuit for Dependable LSI Using Random Address Errors on Embedded SRAM and On-Chip Memory BIST", H. Fujiwara, et al., 2011 Symposium on VLSI Circuits Digest of Technical Papers.

International Search Report/Written Opinion; PCT/US2012/055061; May 16, 2013.

* cited by examiner

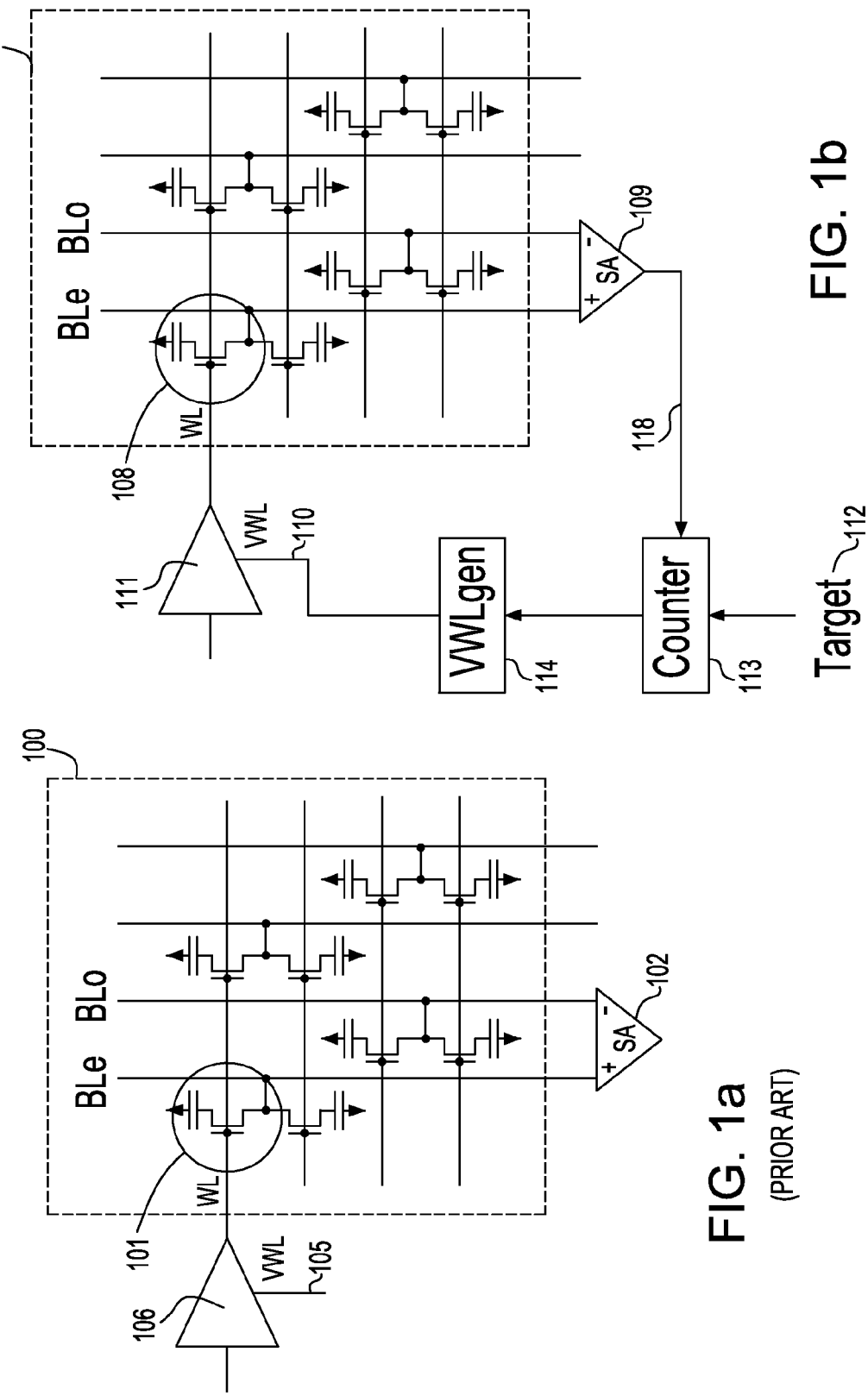

RETENTION BASED INTRINSIC FINGERPRINT IDENTIFICATION FEATURING A FUZZY ALGORITHM AND A DYNAMIC KEY

FIELD OF THE INVENTION

The present invention relates to chip identification using hardware intrinsic keys and authentication responses, and methods and circuits for generating a unique identifying string to identify the chip, and more particularly to a method and a system to generate an unclonable intrinsic identification of a VLSI chip using a static random access memory array or dynamic random access memory array for ID security and high accuracy of authentication.

BACKGROUND AND RELATED ART

The reliability of self-identifying chips has become a necessity in contemporary security and encryption applications. Global Semiconductor Alliance (GSA) describes in "Hardware Intrinsic Security: Fabless Perception and Awareness Study" a need in the semiconductor industry for a secret key storage, wherein the cost is the top barrier that requires to be addressed to increase the adoption of a secret key storage and hardware intrinsic security. Moreover, the unique identification of a specific device is a dominant reason given by practitioners for adopting the secret key storage. Clearly, according to respondents to GSA, generally fabless semiconductor design companies, there is a critical need for a cost-effective solution to internal and external IC clients that provides chip authentication and identification with minimal design and area overhead. The solution should require a minimum amount of additional circuitry or mask levels on the chip, have no impact on yield, and be adaptable to a broad range of products.

Authentication of integrated circuits (ICs) includes physical unclonable functions (PUFs) that use wire path delays (possibly compensated to account for varying temperature/voltage operating conditions), error correction, control modules limiting access to PUFs, random hashing to obfuscate a true PUF input/output relationship, multiple feedback loops through the PUF to increase the response complexity, or PUFs which responses change when a varying clock period is applied.

When identifying devices using physically unclonable functions, the generation of a response to the PUF that uniquely represents the identity of the device includes a device having a memory that extends to the hardware and software and which requires the use of a memory response as a hardware-intrinsic identification for the device. The manufacture and use of SRAMs, latches and FPGAs (for their use of contention between logic gates under certain operating conditions) may have varying characteristics that uniquely distinguish each device from a group.

Systems providing an IC chip with a unique identification may include a block in a chip that can be used for unique identification of the chip. The chip must then include a plurality of identification cells formed within the IC that generates the response as a function of random parametric variations in the cells. It may further expand to cells that include at least one transistor, the mismatch of two transistors, varying types of cells, or values stored on cells that may be read out as a sequence of bits.

While the concept of chip identification circuits in the presence of process variations introduces adjustment of voltage to tune the Hamming distance (i.e., the number of logic 1's in an ID string) of the generated ID to a desirable value, repeated testing of the ID within a single generation cycle can increase the ID stability to ensure that the ID generated at one time can be read out thereafter without difficulty or changing bits.

Although the aforementioned ID solutions theoretically allow for the generation of intrinsic IDs, there is a risk that the generated bits include unstable bits which may change over time, giving rise to the possibility of failing to identify the correct chip, or incorrectly identifying it. There is a further possibility to generate the same ID vectors for multiple chips, particularly when the vector bit string length is short. Increasing the vector length reduces the chance of having the same ID for multiple chips, but it increases the system overhead to manage long vector patterns for recognition. In addition, even if the chip uniquely generates a unique intrinsic ID within a chip, there is a risk that the ID may be copied illegally during the ID read operation. Having longer ID vectors reduces the risk, albeit, at the cost of an increase of complexity of the vector management and system overhead. The key for intrinsic electronic chip identification is to generate a reliable and unique ID generation, for example, for more than one million parts. This requires a stable ID generation and verification to be defined correctly for only one chip without misidentifying the ID with others. In addition to the ID generation challenge, the ID read must be sufficiently secure in order not to be stolen during an ID readout.

FIG. 1a illustrates a prior art dynamic random access memory array (DRAM), consisting of a plurality of one transistor and one capacitor cell (101) arranged in a two dimensional matrix. The DRAM array 100 is supported by a wordline (WL) and bitline (BL), each WL supporting a plurality of cells coupled to either an even BL (BLe's) or to an odd BL (BLo's). This permits creating a BL pair using BLe's and BLo's for a differential sensing scheme. Prior to the memory access, all the BLs are precharged to a BL precharge voltage ($V_{PRE}$). $V_{PRE}$ is preferably set at half the voltage between 0 and 1 voltage stored in the cell. By way of example, it is assumed that the cell stores 0v for a 0, and VDD for a 1, and $V_{PRE}$ set at ½VDD for a ½VDD sensing scheme. When WL rises, cells coupled to the corresponding WL are simultaneously activated, coupling the capacitors in the selected cells to the corresponding BLs (i.e., BLe's). This results in a charge sharing between the cell capacitor and the BL capacitor. Other BLs (i.e. BLo's) remain at the $V_{PRE}$ (½VDD) level, creating a differential voltage (delta SA) between each BL pair. Delta SA on the BLs is then amplified to the full CMOS level and latched by sense amplifiers (SAs) (102). For a '0' reading, BLe is lower than BLo, allowing BLe and BLo to go low and high, respectively. For a '1' reading, BLe is higher than BLo, allowing BLe and BLo to go high and low, respectively, and allowing the cells to restore the fully amplified BL voltage to be written to the corresponding cells. A write mode is enabled by activating WL, allowing the cells coupling the corresponding WL to be written through the BLs (i.e., BLe's). The voltage written to the cells are maintained by capacitors as a dynamic random access memory. The capacitive charge for a '1' data (or VDD) can be leaked as a pause (retention pause time) goes by, resulting in a '1' fail, (retention fail) for the address (failing memory address) corresponding to the leaky fail. To increase the retention time, a WL driver (106) may preferably use a negative voltage (VWL) to reduce the sub-threshold current of the cell (101). The intrinsic chip identification used preferably in the invention will be shown employing the retention behavior with VWL control to create a controllable random binary vector, the details of which will be discussed hereinafter in a preferred embodiment.

Referring to FIG. 2a, a prior art static random access memory cell and supporting circuitry are shown, preferably consisting of a six transistor SRAM cell (201) consisting of cross-coupled inverters (230 and 231) and two access transistors (232 and 233) intended to be arranged in proximity to a plurality of similar six transistor SRAM cells in a two dimensional matrix. Cells are coupled to a wordline (WL) (205) and a bitline (BL) pair (211 and 212). The memory access of the SRAM is enabled by activating the WL enable signal (203). This sets the WL (205) high, coupling the cross-coupled nodes (214 and 215) to the bitlines (211 and 212) through the access transistors (232 and 233). Prior to the WL activation, a bitline equalization enable signal (207) goes low, disabling the BL equalization devices (209), resulting in creating a differential voltage on the BL pair. The differential voltage on the BL pair is converted to a digital binary output using the sense amplifier (SA) (213). As will be shown hereinafter the intrinsic ID generation used in the present invention preferably activates the WL while enabling the equalizer, which results in an abnormal condition, generating a random binary string, the details of which will be discussed hereinafter in preferred embodiments.

SUMMARY

Accordingly, an embodiment of the invention provides a system and a method for identifying a chip using intrinsic parameters that are invariant and unique to the chip over its lifetime. The stable intrinsic ID is tamper-proof and cannot be faked because of its dependence on parameters determined by manufacturing process variations. A typical manufacturing process has several parameters that vary uniquely and randomly on each die, where stable bits are generated by providing a guard band and verification methods for ID generation and authentication.

In one embodiment, the method employs a set of intrinsic retention characteristics that do not recur when using dynamic random access memory that uniquely identifies the chip. By identifying the chip by its intrinsic retention characteristics, many of which may already have been recorded when testing or qualifying the chip, ID security and cost are improved. The embodiment provides an extremely low-cost, high security solution, due to its dense memory array structure using one transistor and one capacitor, without necessitating additional processing, testing, or stress.

In one embodiment, the invention includes adding a circuit to enable challenge-response pairs for at least two IDs per chip stored in a system, wherein the first of the ID vector strings includes the second of the ID vector strings, demonstrating how the challenge-response pairs may be applied and used. The identification and authentication of a first device from a group of devices fabricated based on a common design, each device implementing a first function, is realized by using a third ID string such that the first ID string includes the third ID string, and the third ID string includes the second ID string.

In one embodiment, the invention increases the security of the ID system by having a bit vector for generating the third ID dynamically changed for authentication, such that the security is guaranteed even when the ID read vectors are copied illegally.

One embodiment of the invention advantageously includes a built-in-self-test (BIST) engine to enable an autonomic adjustment of a testing condition to find the first ID binary string and the second ID binary string by using two predetermined corresponding keys. The keys are used only during the first ID and the second ID string generation.

One embodiment of the invention includes a built-in-self-test (BIST) engine to enable an autonomic adjustment of the testing condition to find the third ID binary string by using dynamic keys. The key is used for authentication and dynamically following each authentication.

One embodiment may include encrypting the keys and output ID binary strings to further improve the ID security.

In one embodiment, the invention authenticates a first device by applying a first function whose output depends on an applied multiple bit digital input and on fabrication characteristics of an integrated circuit that may vary between devices as a result of random variations in the fabrication, including receiving a signal at the first device that encodes a first identifier, applying a one-way function using the first identifier as an argument to produce an output of the one-way function, and applying the first function to the output of the one-way function.

In one embodiment, an encryption provides authentication that require challenge response pairs known by conventional encryption without covering identification or authentication using an unknown and varying subset of the original identifying string.

In one embodiment, an array of devices provides functions normally at standard operating conditions that can be forced to operate differently under abnormal operating conditions. The aforementioned abnormal operations can be related to one or more operating parameters, such that adjusting one or more of these parameters beyond the normal operating region induces failures for a controllable number of the devices.

In one embodiment, one or more circuit blocks operate the devices. Chip inputs are applied to the circuit blocks to obtain an ID. When the chip needs to be identified, a similar input is applied to the chip for an initial ID generation. Based on the stated architecture, it is expected that a set similar to the original values within a specified tolerance returned as the ID will be returned at the later time when the ID is read.

In one embodiment, there is provided a method for identifying a chip having a memory array that includes using a computer, determining parameters intrinsic to the memory array; generating a first window address location of the memory array for generating first and second identity (ID) binary strings, and iterating a test on the memory array until a predetermined failcount is achieved. It may further include comparing the first to the second ID binary string, wherein if the first binary string comprises all failing memory addresses of the second string, then the first and second binary string become the chip identity; and otherwise, a second new window address location of the memory array is selected, returning to step b) until the chip identity is obtained.

BRIEF DESCRIPTION OF THE DRAWINGS

The present invention will be understood and appreciated more fully from the following detailed description of embodiments of the invention, taken in conjunction with the accompanying drawings of which:

FIG. 1a shows a schematic of a prior art dynamic random access memory;

FIG. 1b shows a schematic of a dynamic random access memory with supporting circuit blocks which may be used for intrinsic ID generation, according to one embodiment of the invention;

DETAILED DESCRIPTION

Detailed embodiments of the present invention are disclosed herein. However, it is to be understood that the disclosed embodiments are merely illustrative of the invention that may be embodied in various forms. In addition, each of the examples given in connection with the various embodiments of the invention is intended to be illustrative, and not restrictive.

Figure 3:
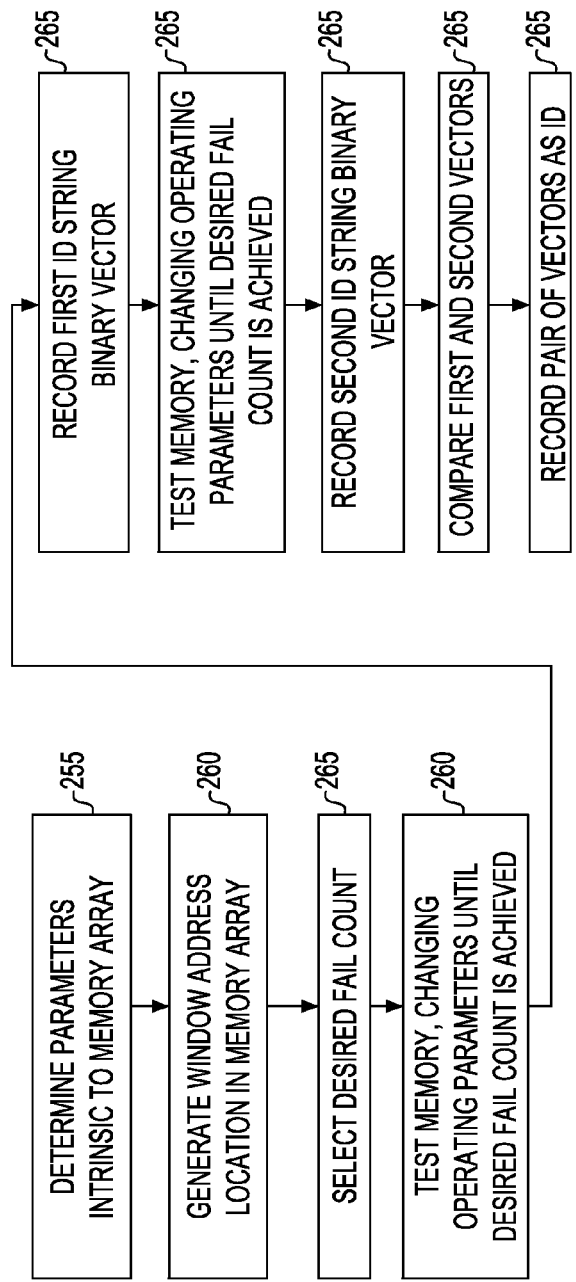
FIG. 3 is a flow chart describing the operation according to one embodiment of the invention.

Referring now to FIG. 3, a flow chart is shown wherein the steps illustrated therein may be used to realize an embodiment of the invention.

In step 255, parameters intrinsic to the memory array are determined, followed by step 260 wherein a window address location in the memory array is created. Next, in step 265, a predetermined failcount is selected to be followed in step 270 by having the test memory change the operating parameters until a predetermined fail is reached. In step 275, a $1^{st}$ ID string binary vector is recorded and followed in step 280 by selecting a predetermined $2^{nd}$ failcount. In step 285, the test memory changes the operating parameter until the desired failcount is achieved. In step 290, the $2^{nd}$ ID string binary vector is recorded. In 295, the $1^{st}$ vector is compared to the $2^{nd}$ vector. In step 299, the pair of vectors is recorded as the ID.

Prior art intrinsic ID generation generates a random bit vector targeting for 50% 1 and 50% 0 data to maximize the Hamming distance. The intrinsic ID generation in an embodiment of the present invention generates two random bit vectors, each having a certain number of 0 or 1 bits, while satisfying the rule that one includes all 1 or 0 bits of the other. This can be done by introducing a feedback loop to the array while observing DRAM array operation with retention behavior, or an SRAM array operation with abnormal condition and an initialization scheme.

Figure 4:
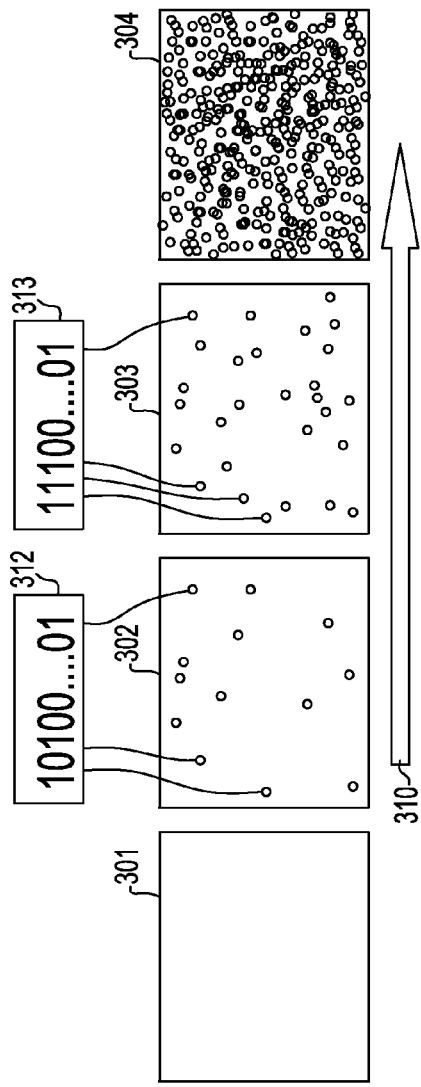
FIG. 4 shows a bit map dependency with respect to testing conditions, including retention pause time, wordline low voltage, or any others that affect, and which illustrates how a longer pause time or higher wordline voltage increases the number of fails as a natural retention behavior.

Referring now to FIG. 4, bit map patterns 301-304 with respect to a test parameter 310 are illustrated, alongside ID binary string vectors 312 and 313 which correspond to bit maps 302 and 303, respectively. For illustrative purposes, let it be assumed that modulated test parameter 310 is the retention pause time for dynamic random access memory (DRAM), shown in FIG. 1b, that includes an array 107 of one transistor and one capacitor cells (1T1C) 108 and sense amplifiers (SA) 109. Prior to generating an intrinsic ID, the DRAM array 107 stores a logic 1 to the capacitor of each 1T1C cell 108 in the array. If the data bits are read before the cell charges leak, the read data are a logic 1, showing a clean bit map 301. If the retention pause time increases, some leaky cell will discharge to a reduced voltage earlier than others, resulting in the bit map showing fails 302 (retention fail). More specifically, the fails (retention fails) are detected on the address (failing memory address) in the bit map corresponding to the leaky cell that causes the fail (retention fail). The number of fails in the bit map increase as a retention pause time is increased 303. Once the retention pause time is sufficiently long, all the cells in the bit map will fail 304 (retention fail). It is relevant noticing that the set of failing bits for a shorter pause time 302 is a subset of a set of failing bits for a longer pause time 303 that satisfies the requirement to create an intrinsic ID.

Referring now to FIG. 1b, the number of fails can be advantageously controlled by a WL low voltage (VWL) 110, the standby state of WL, connected to the WL driver 111. A higher VWL increases the leakage, creating more fails in the bit fail map 303 similar to a longer retention pause time while satisfying the requirement to create an intrinsic ID, while a lower VWL creates fewer fails in bit fail map 302. Additional circuit blocks are provided in an embodiment for feedback of failcount into a VWL adjustment module (voltage generator) 114. The failcounter 113 is provided with a target failcount 112 and adjusts VWL by a command to module 114 repeating testing of the array with new parameters until the target failcount is achieved. The failcounter is a simple counter to count the number of 0 bits from the SA output 118, because reading a logic 0 from the SA is considered a fail. By adjusting VWL for the proper voltage setting, bit maps 302 and 303 can be created to include the target number of the fails, while satisfying the requirement for an intrinsic ID of generating a first and second ID binary string such that the first ID binary string includes all of the failing bits recorded in the second ID binary string. The 2D bit maps 302 and 303 are converted to the two sets of 1D binary string vectors 312 and 313, respectively, as illustrated in FIG. 4, wherein each logic 1 is at the address location of the failing bits. Optionally, the converted ID may be compressed or encrypted to reduce the ID size while improving security.

Figure 2A:
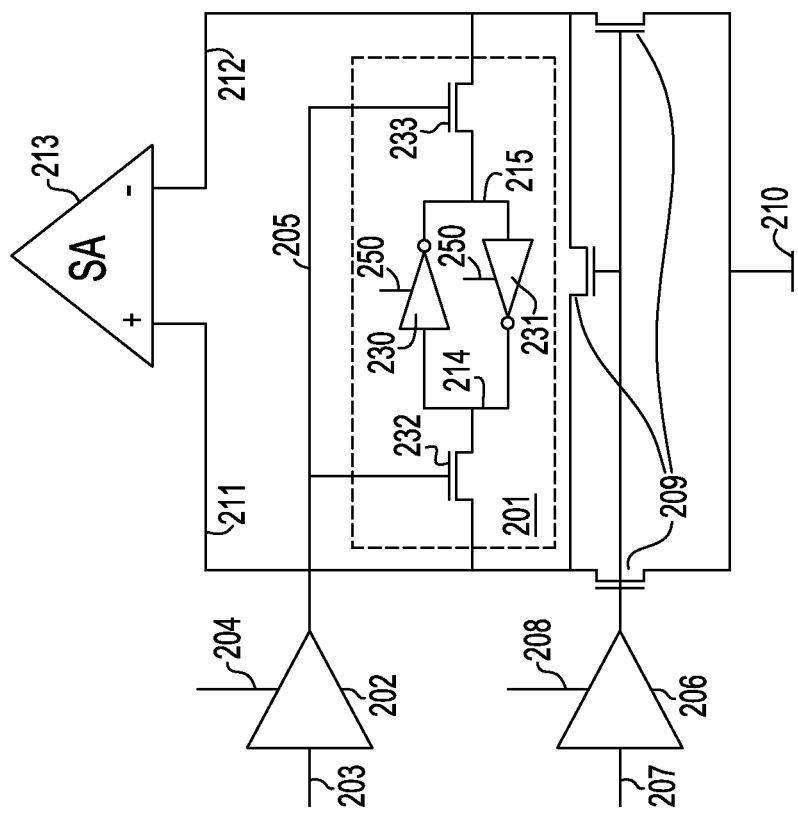
FIG. 2a is a schematic diagram of a prior art static random access memory.
Figure 2B:
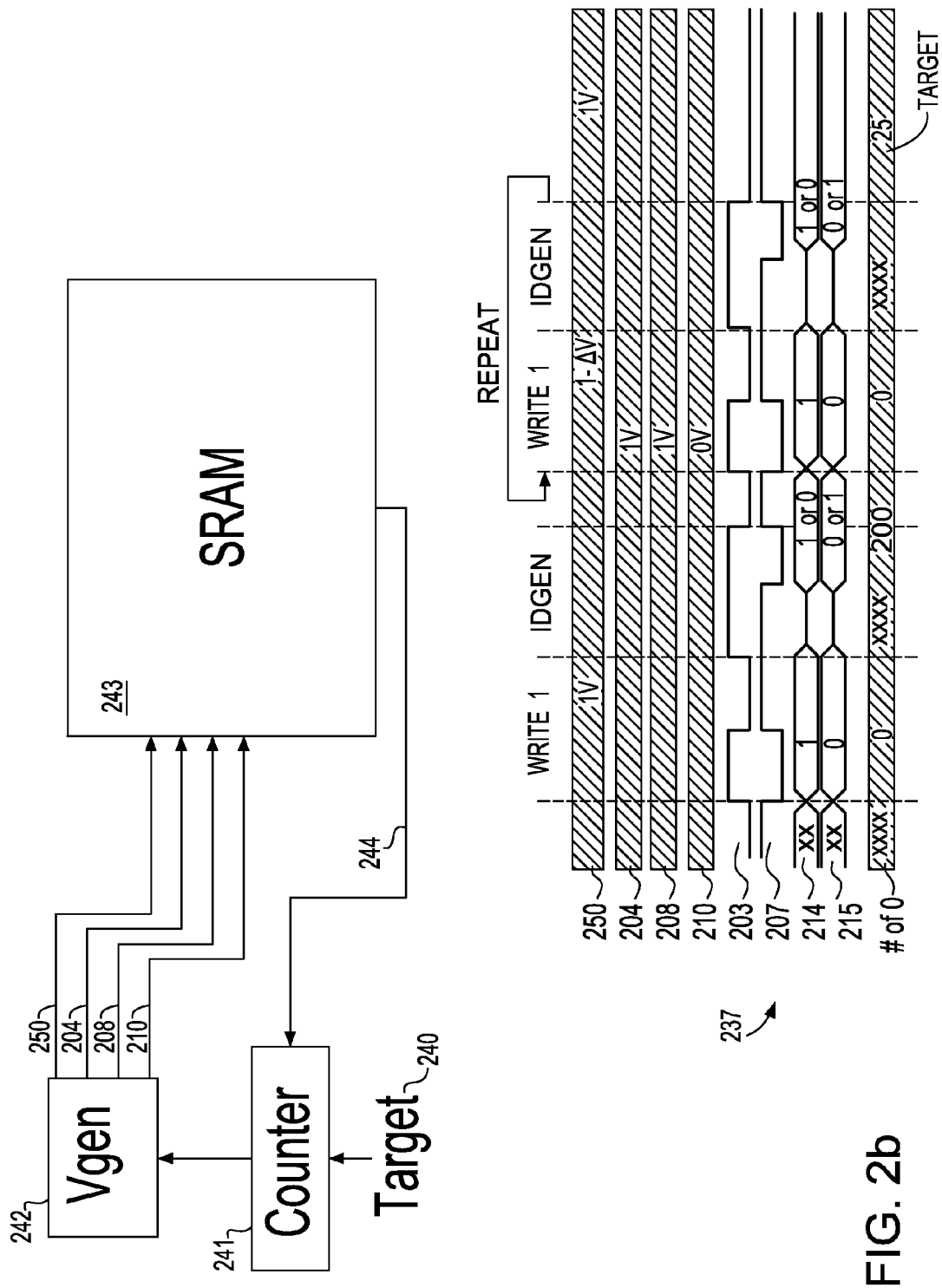
FIG. 2b shows operational timing, voltages, and a schematic of a static random access memory which may be used for intrinsic ID generation, according to one embodiment of the invention.

Alternatively, the number of fails can be advantageously controlled by SRAM bitline equalization voltage levels. Referring back to FIG. 2b, an SRAM-based intrinsic ID generation schematic is shown with a timing diagram, wherein the SRAM array 243 can be a conventional array. As discussed previously, it is of prime importance to provide a method to create two vectors with corresponding two target numbers while satisfying the rule that one of the vectors includes the other. This can be done by using a unique timing control: the timings thereof being shown in diagram 237 providing a visual description of the SRAM operation in D generation mode. Bit-fail maps 302 and 303 in FIG. 4 illustrate the bits that may fail as represented in a second ID binary string and a first ID binary string, respectively. As shown in FIG. 2a, the SRAM array uses a first voltage 250 for the cross-coupled inverters (230 and 231) in a six transistor cell 201, a second voltage 204 for the wordline driver 202, a third voltage 208 for bitline equalization driver 206, and a fourth voltage 210 coupled to the bitlines through said bitline equalizers 209. Prior to the intrinsic ID generation, the cross-coupled nodes 214 and 215 for all memory cells are set high (logic 1) and low (logic 0), respectively. This can be achieved by writing 1 data to the SRAM array, known in the art and, thus, will not be discussed further. For intrinsic ID generation, unlike conventional SRAM operation, the equalizer transistors 209 remain on by keeping signal 207 high when WL is activated by signal 203. This results in a short between the cross-coupled nodes 214 and 215 and to voltage 210. Signal 207 goes low prior to WL deactivation allowing the setting of the cross-coupled nodes 214 and 215 high and low or low and high, respectively. States are determined using access transistors 232 and 233 and equalizer transistors 209 strength and the threshold voltage mismatch for the cross-coupled inverters (230 and 231). This results in generating a binary vector pattern consisting of approximately 50% of logic 0s and 50% of logic 1s. The intrinsic ID generation in this invention creates a skew for the 0 and 1 pattern generation. For example, if access transistor 232, access transistor 233, equalizer transistors 209, or any combination is not adequately strong, the logic value is more likely to flip the originally stored charge. As the cross-coupled node equalizing effect is increased, some bits in the SRAM array will flip to opposite logic states, which is recorded as a fail in a bit fail map. As the aforementioned first voltage is reduced, the node equalization effect is increased, resulting in more failing bits. By adjusting the first, second, third, or any combination of voltages, the bit maps 235 and 236 can be created to include the target number of fails while satisfying the requirement for an intrinsic ID of generating a first and second ID binary string such that the first ID binary string includes all of the failing bits recorded in the second ID binary string. Timing diagram 237 provides a visual description of the SRAM operation in ID generation mode. Bit-fail maps 235 and 236 illustrate the bits that may fail as represented in a second ID binary string and a first ID binary string, respectively. The node equalization effect can be alternatively increased by any combination of adjusting the first voltage, second voltage, or third voltage.

By way of example, adjusting the first voltage 250 makes it possible to achieve a target failcount for ID generation using SRAM by adjusting operating conditions over multiple read and write cycles, as shown in the timing diagram (237). As previously described, if the nodes (214 and 215) are shorted with nominal voltages (250: 1V, 204: 1V, 208: 1V, and 210: 0V), the generated vector will be likely 50% of 0s and 1s. In one embodiment of the present invention, to realize an intrinsic ID vector which increases the target number of 0 or 1, first a logic 1 is written to every cell of the memory array in a normal operating mode and, then, the counter determines the number of 0 bits. If the bits are read as a conventional read operation, all data will be 1, resulting in 0 fails, as shown in 301. Next, the cross-coupled nodes (214 and 215) are shorted by enabling the WL without disabling the BL equalizer for a predetermined time. When the equalizer is disabled, the cross-coupled nodes (214 and 215) are flipped depending on the process random parameters, resulting in approximately 50% of the bits flipping from 1 to 0. The number of the fails is monitored by the counter 241, which controls the first voltage 250 for the next attempt. If the target failcount is not achieved by this action, a normal SRAM write cycle is performed to rewrite 1 data to every cell of the array, and then the first voltage 250 is decreased to a second value by Vgen 242. The array is now accessed using the ID generation timings but including the new voltage setting for 250, expecting that the number of bits changing from 1 to 0 will favorably decrease from the previous first ID generation cycle, bringing the number of failing bits closer to the target value 240. The process of rewriting 1s, decreasing the first voltage 250, applying ID generation timings, and reading out the memory bits is repeated until the desired failcount is achieved.

The generation of the two sets of the intrinsic IDs can be generated by changing other voltages. For example, changing the bitline equalizing voltage (208) allows control of the number of 1 bits. In this approach, all cells are written to a 1 similar to the previous 250 method with nominal voltage (250: 1V, 204: 1V, 208: 1V, 210: 0V) as a first step. The voltage (208) is set at 0V. This results in zero fail bits (perfect bitmap for reading 1) because the cross-coupled nodes (214 and 215) are not shorted even if the WL are equalizer are on at the same time. As a next step, the voltage 208 is increased to 0.1V, allowing the cross coupled nodes (214 and 215) to be weakly shorted, resulting in few fails (few bits are 0), the results of which is observed by the counter (241). If the number of fails does not meet the target number, the Vgen (242) increases the voltage 208 0.2V. This process is repeated until the number of the fails meets the target number. The ID generation can also be realized by changing the WL voltage (204) using a similar method. In conclusion, the node equalization effect can alternatively be increased or decreased by any combination of adjusting the first voltage, second voltage, third voltage, or fourth voltage, allowing generation of two ID vectors while satisfying the corresponding targets.

Structures are illustrated that enable adjustment of voltages to advantageously control SRAM failcounts for intrinsic ID generation. A target failcount 240 is presented to a failcounter 241. The counter requests an adjustment of the first, second, third, fourth, or any combination of voltages by input to voltage generator 242, which adjusts the voltages and applies them to the SRAM array 243. The resulting 244 output from the SRAM array, is fed back into the failcounter 241, which iterates the above steps until the target failcount is achieved.

Regardless of the ID generation using retention pause, the VWL voltage, or the SRAM voltage control, the retention fail bits of a shorter retention pause time, lower VWL voltage, or higher SRAM bitline equalization voltage are included in the retention fail bits of the longer retention time, higher VWL voltage, or lower SRAM equalization voltage.

The following embodiment assumes that the retention based intrinsic ID generation uses a VWL control. However, it can be applied for the retention pause or SRAM bitline equalization approaches.

Figure 5:
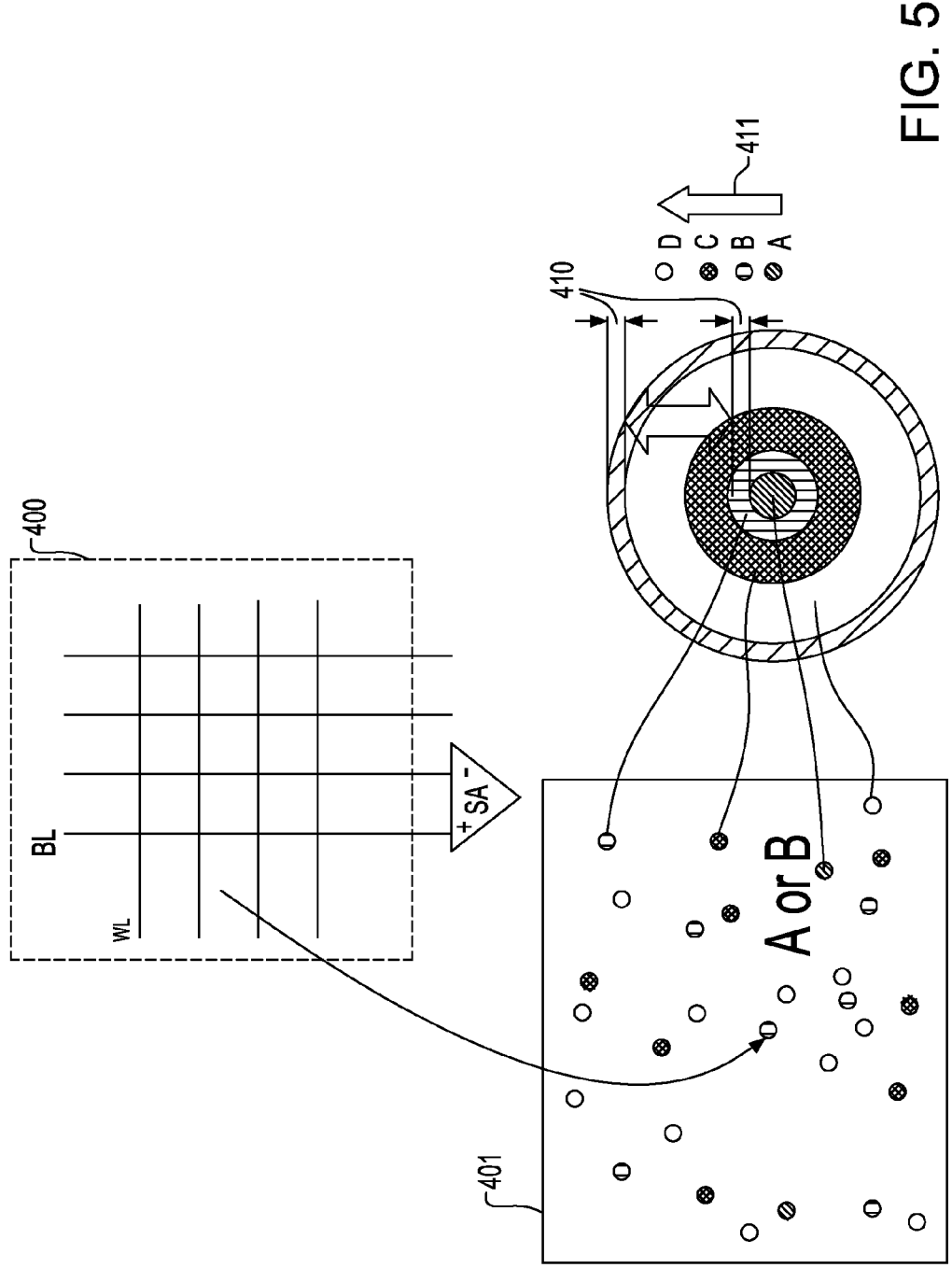
FIG. 5 depicts an array schematic including an unstable bit, a guard band, and a safe zone.

Referring to FIG. 5, the voltage modulation or retention based intrinsic chip ID, (hereinafter referred to RICID) in conjunction with a fuzzy algorithm will be employed. RICID preferably uses retention fails to create the ID vector pattern. As previously mentioned, because of the nature of DRAM cell retention, the generated vector bits are a random pattern for each chip which can be advantageously used for the intrinsic ID. The present approach may, however, misidentify the chip when a number of bits changes. The unstable bits will appear or disappear in the list of failing bits when the detected bits are near the boundary of the retention corner. RICID employs a plurality of test patterns or parameters such that a fail vector for a short retention time and more favorable voltage is a subset of a fail vector for a longer retention time and more failure-inducing voltage.

A memory array is shown (400), consisting of WL and BL but with the individual cells omitted. The bit fail map (401) represents the results of applying test conditions to a memory array and observing cell failures at certain addresses, represented as circles. Failing bits are categorized into a plurality of zones (e.g., A, B, C and D), where vectors A, B and C are included in vector D (the predetermined longest retention or least favorable test corner). The zones, shown with respect to adjustment of an operating parameter that allow control of the number of cells failing (411) such as VWL, are depicted next to a diagram showing that changing the operating parameter will cause an array bit to fail if its physical characteristics fall within the range of a zone, such as A, B, C, or D. If A is observed to be within D, then B and C are predicted to be within D. An additional guard band (GB) (410) is included for each zone boundary, resulting in the creation of a Safe Zone (SZ) defined by the vector having a minimum set of failing bits plus a guard band and the vector having a maximum set of failing bits minus a guard band. RICID is therefore recognized as unique even if a few unstable bits change, as long as they remain within the safe zone.

Figure 6:
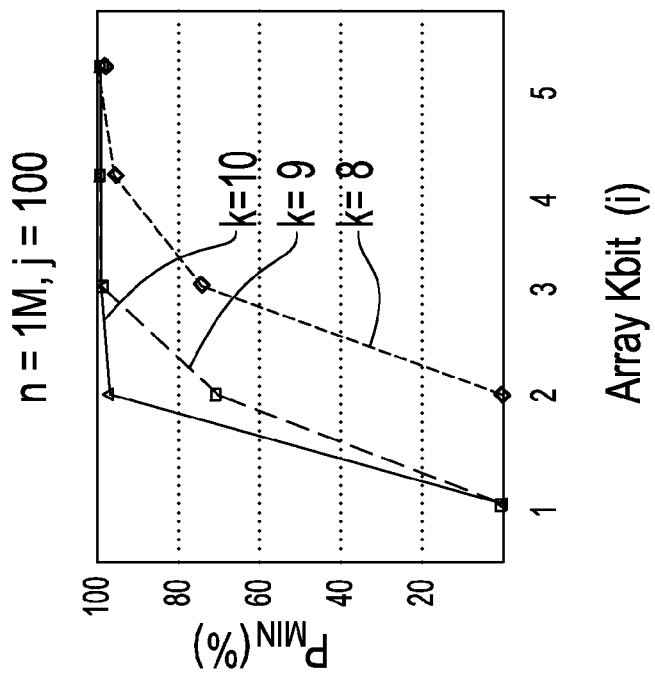
FIG. 6 illustrates the probability $P_{FUZZY}(>P_{MIN})$ of generating a unique ID.

Referring to FIG. 6, an analytical model for the probability $P_{FUZZY}$ of creating a unique ID is illustrated, where i, j, k, and n represent the number of bits in the eDRAM array, respectively, the maximum number of retention fails, the minimum number of retention fails, and the number of samples or chips used. The model predicts that a 4 Kb array (I=4K), with j=100 and k=10, is more than adequate for more than 99% of a unique RICID probability for $10^6$ parts.

Figures 7, 8:
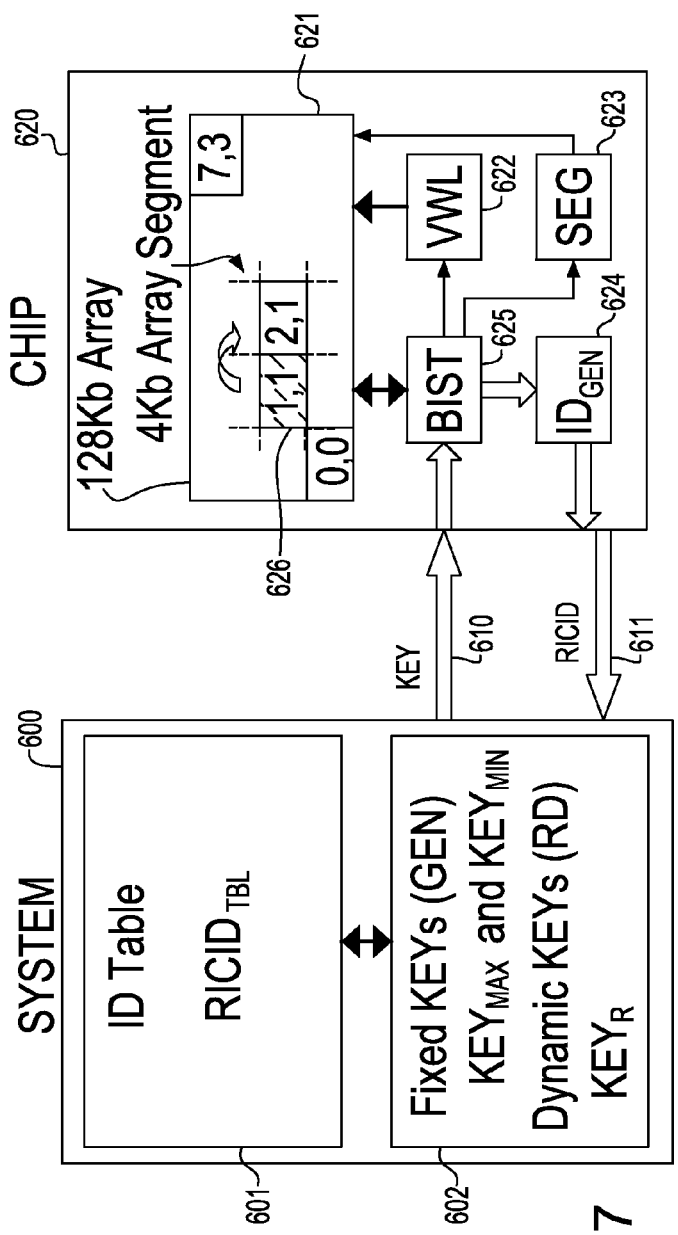
FIG. 7 shows a chip and system architecture for retention based intrinsic chip identity (RICID) generation and detection.
FIG. 8 shows a table of terms relevant to RICID.

Referring now to FIG. 7, the chip (620) and system (600) architecture and a flow chart employing RICID with a fuzzy algorithm are shown. For illustrative purposes, the chip is assumed to consist of 128 Kb eDRAM array (621) with 32 4 Kb segments (626) numbered (0, 0) to (7,3). They are supported by a BIST (625), wordline low voltage (VWL) generator (622), RICID generator ($ID_{GEN}$) (624), and segment manager (SEG) (623). To avoid process edge effects and increase the randomness of the ID, only the 12 center segments whose coordinates fall between (1,1) and (6,2) are used. The system includes a module (602) that requests an RICID with a given KEY (610) and expects an RICID (611) response. It further includes the capability to store the RICID in the table (601) $RICID_{TBL}$.

For generation purposes, the system provides the chip with two fixed keys (602), $KEY_{MIN}$ and $KEY_{MAX}$, which are, respectively, minimum and maximum numbers of the retention fails expected in an RICID string. When the chip receives ID requests (610), the BIST (625) changes VWL (622) so that $KEY_{MIN}$≤the number of RICID≤$KEY_{MIN}$+GB for the first segment (1,1). If the chip does not satisfy this condition, BIST selects the next segment (2,1) using SEG (623). If the BIST finds an appropriate condition, the vector $RICID_{MIN}$ is temporarily stored by the BIST, and the BIST initiates a search for the vector $RICID_{MAX}$ using the second value $KEY_{MAX}$ by changing VWL to satisfy $KEY_{MAX}$–GB≤number of RICID≤$KEY_{MAX}$. Verification is achieved by confirming that the vector $RICID_{MIN}$ is a subset of $RICID_{MAX}$. Otherwise, the vectors are deemed unreliable, the improper condition is detected by the BIST, and the segment is incremented by SEG to search for new $RICID_{MIN}$ and $RICID_{MAX}$ vectors using the aforementioned VWL tuning previously described to be applied to the next segment. If a suitable $RICID_{MIN}$ and $RICID_{MAX}$ pair is found, the vectors are compressed by $ID_{GEN}$ (624) and are outputted to the system as a RICID (611). The RICID vector is then compared with existing $RICID_{TBL}$ vectors in an RICID table (601), if available, to confirm that it is a unique ID. Else, the system requests a new RICID pair by requiring the BIST to increment the segment selection SEG. The unique RICID is preferably stored in a table by the manufacturer. More generally, SEG may optionally be stored in an eFUSE or in a table.

The RICID read operation is enabled by providing the read key $KEY_R$ to the chip at KEY (610). To improve security, $KEY_R$ is dynamically changed at each read operation. Two adjacent $KEY_R$ values should be more than two GBs apart, permitting a correct detection even if unstable bits change within a boundary. Once the BIST is configured for ID detection, and after receiving the $KEY_R$ input, the chip generates a fail vector $RICID_R$ by changing VWL in a method similar to the RICID generation mode. $RICID_R$ is then outputted to the system. Initially, the system checks if the number of 1 bits in $RICID_R$ is equal to the quantity $KEY_R$ input by the system within the tolerance of GB, in order to prevent an illegal key readout, such as a previous key that a counterfeit may have preprogrammed. If the quantity is valid, $RICID_R$ is compared against the table of RICIDs stored by the foundry or OEM to find $RICID_{MAX}$, of which the given $RICID_R$ is a subset.

Referring to FIG. 8, a table defining terms relevant to RICID generation, detection, and storage is illustrated.

The input to the chip is KEY, the output from the chip is RICID, and the stored value is RICID-TBL. For ID generation, the KEY values provided are $KEY_{MIN}$ and $KEY_{MAX}$, which describe the minimum and maximum number of 1 bits permitted in the ID string, subject to a GB, the RICID response values are, respectively, $RICID_{MIN}$ and $RICID_{MAX}$, and the resulting stored $RICID_{TBL}$ values are $RICID_{MIN}$ and $RICID_{MAX}$. During the ID read operation, the value $KEY_R$ is input to the chip, and the response is $RICID_R$, which is compared to, and expected to be a subset of, $RICID_{MAX}$ stored in $RICID_{TBL}$.

Figure 9:
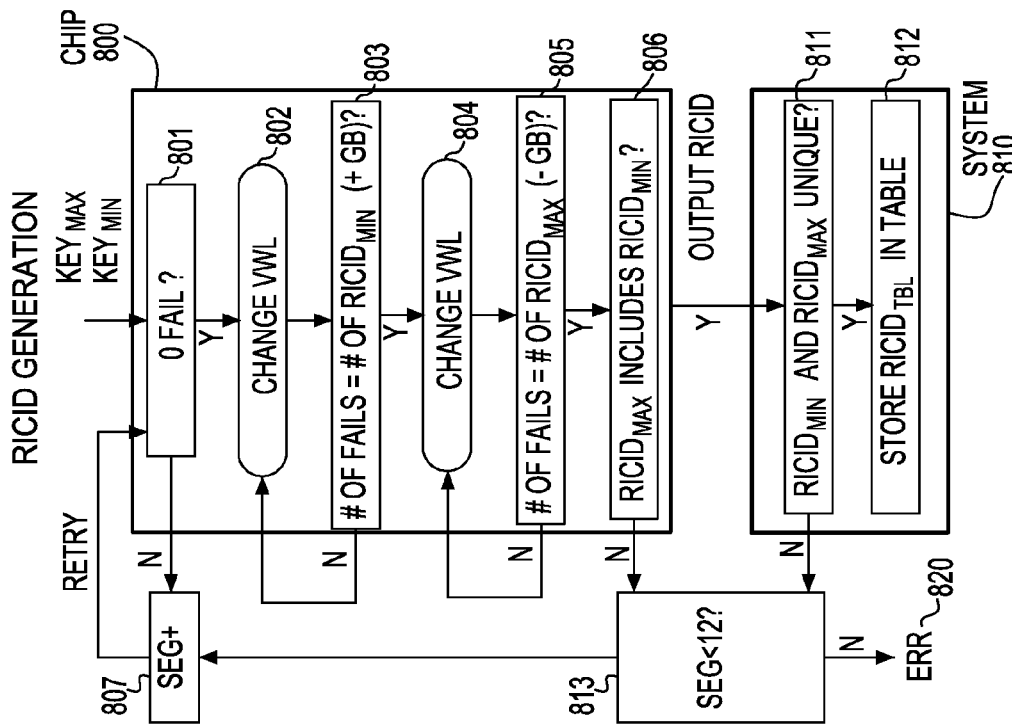
FIG. 9 illustrates the RICID generation flow.

Referring to FIG. 9, a flow chart illustrating the steps for RICID generation is depicted, including a particular manner in which a suitable RICID may be found. The chip (800) input receives $KEY_{MIN}$ and $KEY_{MAX}$. An initial test condition is applied to a segment of the memory array with the expectation that the array will have no failing cells (801). If it does, a different segment must be selected (807). Otherwise, the VWL level (or other suitable test parameter) is changed (802) until the number of fails occurring on the chip is greater than or equal to $KEY_{MIN}$ but less than $KEY_{MIN}$+GB (803). Failing cell addresses are recorded temporarily as $RICID_{MIN}$. The VWL level (or other suitable test parameter) is further changed (804) until the number of failing cells occurring on the chip is greater than or equal to $KEY_{MAX}$–GB but less than or equal to $KEY_{MAX}$. Failing cell addresses are recorded temporarily as $RICID_{MAX}$. If $RICID_{MAX}$ includes $RICID_{MIN}$ (806), the $RICID_{MIN}$ and $RICID_{MAX}$ values are output to the system (810). If $RICID_{MAX}$ does not include $RICID_{MIN}$, the segment is incremented to the next suitable position (813), and the process is repeated starting from 801. If no suitable segments are available, an error is reported (820) and no chip ID can be recorded by this scheme due to unsuitable hardware. Next, $RICID_{MIN}$ and $RICID_{MAX}$ are compared to the list of existing recorded RICID values in a table (811). If they are unique among the group of devices fabricated to given specifications, then the RICID values are stored in a table (812) by the manufacturer or OEM.

Figure 10:
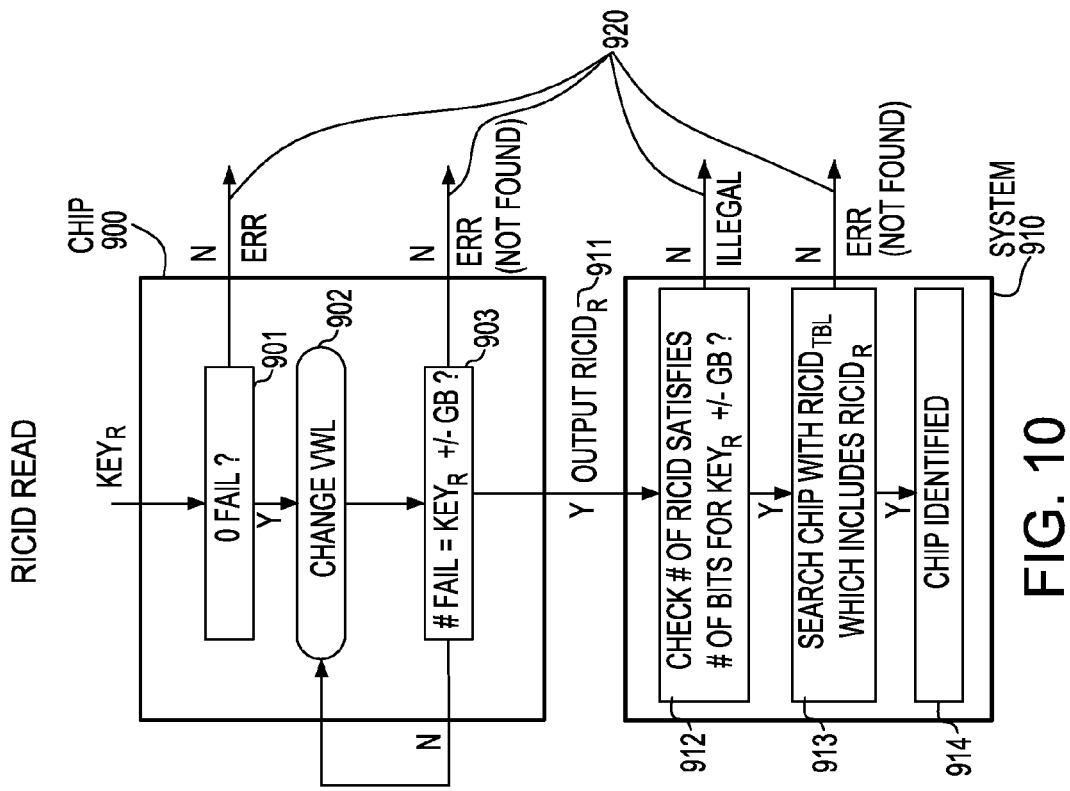
FIG. 10 illustrates the RICID detection flow.

Referring to FIG. 10, a flow chart illustrating steps for an RICID reading is shown, including the specific manner in which a suitable RICID may be found. The chip (900) input receives $KEY_R$. An initial test condition is applied to the segment from which the RICID was originally collected with the expectation that the array will have no failing cells (901). If it does, the chip is damaged and an RICID cannot be read, so an error is reported (920). If it does not, the VWL level (or other suitable test parameter) is changed (902) until the number of fails occurring on the chip is nearly equal to $KEY_R$, within GB of $KEY_R$ either greater or less (903). If the suitable failcount cannot be found by moving the specified test parameter, then the chip cannot be identified, and may even be a counterfeit chip (because an authentic chip would have provided control over the failcount), so an error is reported (920). The failing cell addresses are output from the chip as $RICID_R$ (911). The system (910) receives $RICID_R$ and checks if the number of failing bits reported in $RICID_R$ is close to $KEY_R$ and within GB (912). If it is not, the chip is not valid and an error is reported (920). Next, the table of RICID values $RICID_{TBL}$ is searched for a stored $RICID_{MAX}$ value that includes $RICID_R$ (913). Otherwise, the chip is not a member of the group of devices and may be counterfeit, or it may be of an unknown source, or otherwise be invalid, in which case an error is reported (920). Otherwise, the $RICID_R$ matches with a value in the table and the chip is successfully identified (914).

The illustrative chip presently used is assumed to not have a BIST or a built-in VWL adjustment function. However, they can be emulated by ATE communicating by way of the memory array in DMA mode. RICIDs are preferably collected for 32 eDRAM arrays by incrementing the VWL value applied to the memory array in 2 mV steps to collect a predetermined number of fails. For the present illustrative demonstration, an array area of 4 Kb is selected. The RICID having at most 100 bits within the 15% GB was collected from each chip by moving the VWL value and RICID was verified for the selected array area by confirming that obtaining 10 failing bits from the chip and confirming that the same failures occurring in the original RICID. Next, the chips are identified using sample $KEY_R$ requests of 25, 50, and 75. Using these inputs to the simulated BIST, it confirms that the chips can be uniquely identified using a subset of the original recorded $RICID_{TBL}$.

Figure 11:
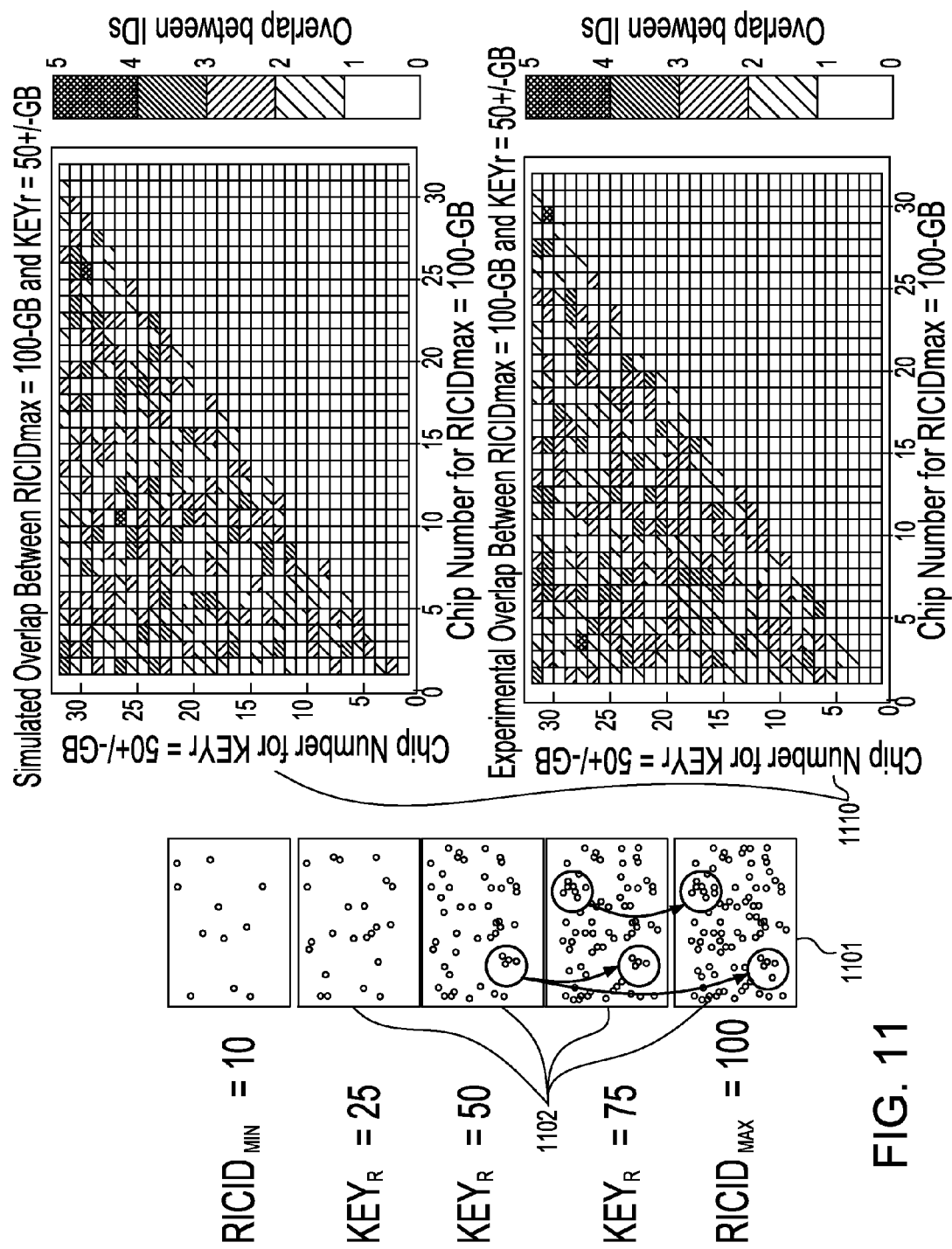
FIG. 11 shows hardware and simulation results showing bitmaps and ID uniqueness.

Referring to FIG. 11, the hardware results for 32 chips are illustrated. The collection of bit maps for a single chip across varying ID sizes (1101) shows failures traced (1102) from one ID to the next for a 4 Kb area. The plots (1110) depict a maximum of 5 common bits present in failing vectors for any combination of a first chip's RICID=100 and the same chip's $KEY_R$=50 in Monte Carlo simulation and in hardware.

Figure 12:
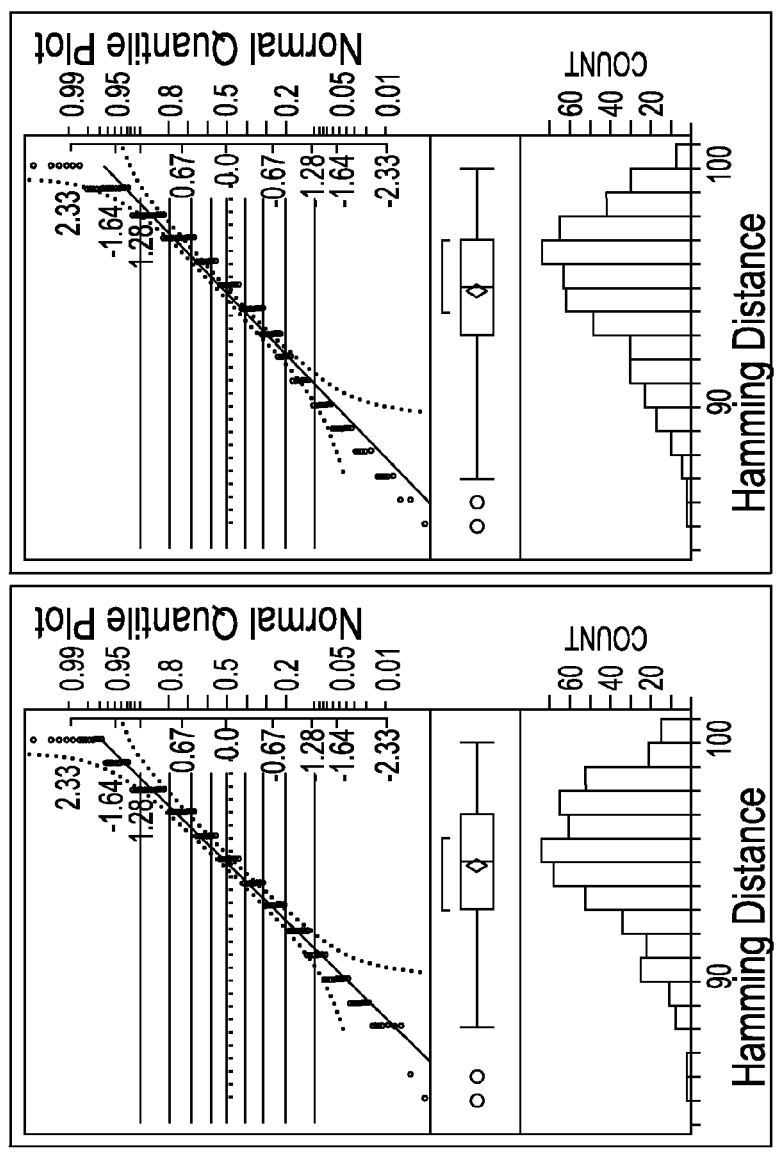
FIG. 12 illustrates the hardware and simulation results showing Hamming distance.

Referring to FIG. 12, Hamming distance distributions are illustrated for all pairs of $RICID_{MAX}$ vectors which were generated by Monte Carlo simulation (1201) and experimentally using hardware (1202). Both sets of vectors preferably had j ranging from 86 to 100 and a mean number of fails equal to 94.8 for RICID. Mean and σ of the Hamming distance were 94.7 and 2.8 for simulated results and 94.6 and 3.0 for experimental results. Distances are normally distributed within 95% confidence limits in normal quantile plots.

The present invention can be realized in hardware, software, or a combination of hardware and software. The invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present disclosure has been particularly shown and described with respect to preferred embodiments thereof, it will be understood by those skilled in the art that the foregoing and other changes in forms and details may be made without departing from the spirit and scope of the present disclosure. In one therefore intended that the present disclosure not be limited to the exact forms and details described and illustrated, but fall within the scope of the appended claims.

What is claimed is:

1. A method for identifying a chip having a memory array comprising;
   a) using a computer, determining parameters intrinsic to said memory array;
   b) generating a window address location of said memory array;
   c) selecting a first fail-count target;
   d) generating first binary strings using a first bit map by iterating a test on said window address location of said memory array while enabling a feedback to said memory array for controlling a number of first fail-counts until said first fail-count target is reached, wherein said first bit map includes passing and failing memory address locations;
   e) selecting a second fail-count target smaller than said first fail-count target;
   f) generating second binary strings using a second bit map by iterating a test on said window address location of said memory array while enabling a feedback to said array for controlling the number of second fail-counts until said second fail-count target is reached, wherein said second bit map includes passing and failing memory address locations; and
   g) comparing said first binary string to said second binary string, wherein when said first binary string comprises all failing memory addresses of said second binary string, then said first binary string and second binary string become said chip identity (ID).

2. The method as recited in claim 1, further comprising selecting a new window address location of said memory array when said first binary string does not include all of said failing memory addresses of said second binary string.

3. The method as recited in claim 1, wherein said memory array comprises a plurality of cells comprising one transistor and one capacitor, wherein each of said cells stores a charge as a logic 1 to said capacitor prior to generating said first and second bit maps and wherein said stored charge as a logic 1 leaks, generating retention fails in said first and second bit maps.

4. The method as recited in claim 3 further comprises controlling the number of said fail-counts due to said retention fails using a retention pause time or using a word line (WL) low voltage.

5. The method as recited in claim 4, wherein said retention pause time or said WL low voltage are adjusted using a built-in-self test engine detecting retention fails in said first and second bit maps, and a counter detecting a number of retention fails in said first and second bit maps, wherein said number of retention fails is approximately equal to both of said fail-count targets.

6. The method as recited in claim 1 further comprising storing said first binary strings and second binary strings in a database as said ID used for authentication, wherein said authentication is enabled by generating a third binary string with an intermediate fail-count, in which the intermediate fail-count is less than said first fail-count and more than said second fail-count, and wherein said third binary string includes the failing memory addresses in said third binary string, and said third binary string includes the failing memory addresses in said second binary string.

7. The method as recited in claim 6, wherein an intermediate fail-count is changed at each authentication.

8. The method as recited in claim 6, wherein said intermediate fail-count further includes a guard-band to eliminate bit instability near said first and second ID generation boundary.

9. The method as recited in claim 1 wherein said first and second binary strings are enabled by applying two corresponding fixed keys to identify said target of said fail-counts to said first and second binary strings.

10. The method as recited in claim 1, wherein said memory array comprises a plurality of cross-coupled inverter cells, and wherein each of said cells store a logic 1 to flip in one direction and a logic 0 when in an opposite direction.

11. A method for identifying a chip comprising:
   a) using a computer, determining parameters intrinsic to said memory array
   b) generating a window address location of said memory array;
   c) selecting a first fail-count target;
   d) generating first binary strings using a first bit map by iterating a test on said window address location of said memory array while enabling a feedback to said memory array for controlling a number of said fail-counts until said first fail-count target is achieved, wherein said first bit map includes passing and failing memory address locations;
   e) selecting a second fail-count target smaller than said first fail-count
   f) generating second binary strings using a second bit map by iterating a test on said window address location of said memory array while enabling a feedback to said array for controlling the number of said fail-counts until a second fail-count target is obtained, wherein said second bit map includes passing and failing memory address locations; and
   g) comparing said first binary string to said second binary string, wherein when said first binary string comprises all failing memory addresses of said second binary string, then said first binary string and second binary string become said chip identity (ID).

12. The method as recited in claim 11, wherein a third ID read from said chip is changed at each consecutive authentication event.

13. A non-transitory program storage device readable by a machine, tangibly embodying a program of instructions executable by the machine to perform method steps for identifying a chip having a memory array, the method steps comprising:
   a) using a computer, determining parameters intrinsic to said memory array;
   b) generating a window address location of said memory array;
   c) selecting a first fail-count target;
   d) generating first binary strings using a first bit map by iterating a test on said window address location of said memory array while enabling a feedback to said memory array for controlling a number of said fail-counts until said first fail-count target is achieved, wherein said first bit map includes passing and failing memory address locations;
   e) selecting a second fail-count target smaller than said first fail-count target;
   f) generating second binary strings using a second bit map by iterating a test on said window address location of said memory array while enabling a feedback to said array for controlling the number of said fail-counts until a second fail-count target is obtained, wherein said second bit map includes passing and failing memory address locations; and
   g) comparing said first binary string to said second ID binary string, wherein when said first binary string comprises all failing memory addresses of said second binary string, then said first binary string and second binary string become said chip identity (ID).

* * * * *